Patented Apr. 13, 1954

2,675,323

UNITED STATES PATENT OFFICE 2,675,323

REFRACTORY MATERIALS

Terence Stanley Busby, Kingsbury, and Maurice Manners and John Henry Partridge, Pinner, England, assignors to The General Electric Company Limited, London, England No Drawing. Application January 10, 1951, Serial No. 205,438

7 Claims. (Cl. 106—57)

This invention relates to refractory materials, and more particularly to coherent bodies of refractory materials of novel composition, suitable for use in the form of blocks for the construction of tank furnaces for glass manufacture. The invention also relates to a method of manufacturing such coherent bodies.

An important requirement of the refractory blocks of which tank furnaces used for glass manufacture are constructed is that they shall resist the corrosive attack of the molten glass, and of the mixture of raw materials for making the glass, which are contained in the tank during the glass manufacturing process. Furthermore, low porosity is a very desirable property of the blocks, in order to reduce to a minimum disintegration of the blocks due to penetration of corrosive agents beneath the surface of the blocks. A further requirement of the tank furnace blocks is that they shall withstand, without marked deformation, the high temperatures to which they are heated during the manufacture of the glass.

These refractory tank furnace blocks are usually made from materials which are predominantly composed of aluminum silicates, such as clay or sillimanite, the blocks being formed by moulding the raw materials to the desired shape and then baking to a high temperature such that the clay or other silico-aluminous material initially present is dehydrated and is converted mainly into mullite, a crystalline silico-aluminous substance of the composition $3Al_2O_3.2SiO_2$, with the liberation of silica. The refractory blocks thus produced are therefore composed essentially of mullite crystals bonded together with a vitreous matrix, the proportion of vitreous matrix present being determined partly by the amounts of impurities initially present in the raw material and partly by the amount of free silica present in the vitreous state as a result of the firing of the moulded blocks. The vitreous matrix may form about 50% of the material of the blocks made in this way, or an even higher proportion.

At the high temperatures to which tank furnace blocks are subjected during the manufacture of glass in the furnace, the vitreous matrix of the refractory blocks made as described above is of sufficiently low viscosity to be capable of flowing and hence, in the proportions usually present, of giving rise to deformation of the blocks. Also the vitreous matrix is more readily attacked by the molten glass or constituents thereof than is the crystalline mullite constituent of the blocks.

It is known to manufacture tank furnace blocks having a higher mullite content and therefore a lower proportion of vitreous matrix than those described above by the method of fusion casting, that is to say by fusing the raw materials, comprising clay and alumina, for example in an electric furnace, and casting the molten material in a mould. It has also been proposed to incorporate zirconia (zirconium oxide) in the silico-aluminous tank blocks made by fusion casting.

It has further been proposed to employ blocks made from a mixture of zircon (zirconium silicate) and zirconia for the construction of furnaces used for melting special glasses at very high temperatures, of the order of 2,000° C. Such blocks, however, are very porous and are attacked by glasses of the soda-lime and other common types.

It is the object of the present invention to provide a coherent body of refractory material of novel composition, which can be made by a heating process not involving fusion of the starting materials and which can be obtained in the form of blocks very suitable for use in the construction of tank furnaces for glass manufacture.

According to the invention a coherent body of refractory material consists substantially of crystals of mullite and of zirconium silicate, and a siliceous vitreous matrix with which the said crystals are bonded together, the proportion of vitreous matrix being less than 20% by weight of the body and the proportion of zirconium silicate being between 40% and 85% by weight of the body.

The mullite may conveniently be produced in situ by heating clay or some other suitable silico-aluminous material; thus a refractory composition according to the invention may be produced, for example, by heating a mixture of zircon and clay for at least 24 hours to a temperature of at least 1500° C., but below the fusion temperature of the mixture.

The preferred method of manufacturing a refractory composition according to the invention comprises heating at a temperature of at least 1500° C., but below the temperature of the mixture, a substantially homogeneous mixture of clay and zircon, the zircon being in a proportion between about 37% and 83% by weight of the mixture.

The refractory bodies according to the invention can be obtained with considerably lower porosity than the blocks made from zircon and zirconia referred to above, since the mullite and the vitreous matrix present serve to bond the crystals of zirconium silicate together, the mullite crystals growing in the vitreous matrix and filling the interstices between the zirconium silicate crystals.

Preferably the silico-aluminous material employed for the manufacture of refractory compositions according to the invention is substantially pure china clay, which contains a higher proportion of alumina and a lower proportion of free silica and other mineral impurities, and thus a higher proportion of the essential constituent aluminium silicate $Al_2O_3.2SiO_2.2H_2O$, than is the case with other clay materials, and which therefore on heating gives a product containing a higher proportion of mullite crystals and a lower proportion of vitreous matrix. Moreover the vitreous matrix formed on the decomposition of china clay is more viscous than that produced by the decomposition of other clays containing a greater proportion of impurities. Hence the use of china clay is of assistance in obtaining a product of good rigidity at high temperatures.

The zircon used should be in a finely ground form, preferably consisting entirely of particles capable of passing through a sieve having 200 meshes to the inch; moreover it is desirable that a proportion of the zircon, say 10% of the total mixture, should be in the form of particles capable of passing through a sieve having 320 meshes to the inch.

For imparting a desired shape to the coherent body of the invention, the mixture of raw materials may be moulded to the required shape before heating.

The preferred method of manufacturing coherent refractory bodies according to the invention, for example in the form of blocks suitable for the construction of tank furnaces for glass manufacture, comprises the steps of mixing powdered zircon and china clay, in the required proportions, with water containing a small proportion of one or more suitable deflocculating agents such as sodium silicate and sodium carbonate, to produce a slurry, forming this slurry into the required shape, drying, and firing at a suitable temperature above 1500° C. For forming the blocks the method of slip casting may conveniently be used: thus the aqueous slurry of the raw materials is poured into a plaster mould, and when the outside of the cast block has dried the mould is stripped off, and the block is allowed to harden throughout and is then fired at the appropriate temperature.

One method of manufacturing blocks of a refractory composition according to the invention, for use in the construction of glass tank furnaces, will now be described by way of example.

In this method, a mixture of the following composition is prepared, the materials being in powder form, percentages being by weight:

| | Per cent |
|---|---|
| Zircon (−200 mesh/inch) | 75 |
| China clay (89.2% $Al_2O_3.2SiO_2$) | 25 |

This material is mixed with sufficient water to form a thick slurry, the water also containing sodium silicate and sodium carbonate in the proportions of 0.4% and 0.1% respectively by weight of the weight of clay. The slurry is poured into suitably shaped plaster of Paris moulds, and when the outsides of the moulded blocks have hardened the moulds are stripped off. The blocks are then allowed to stand at room temperature for a sufficient time to ensure that the interiors of the blocks have dried off and hardened. The blocks are then heated slowly in a furnace to a temperature of 1550° C. and are maintained at this temperature for periods up to two days, the actual length of time depending on the size of the blocks being fired, and are then allowed to cool slowly to room temperature. The final products consist of a coherent refractory material of high density and very low porosity, which is highly resistant to attack by molten glass.

We claim:

1. A coherent body of refractory material consisting substantially of crystals of zirconium silicate, and crystals of mullite and a vitreous matrix consisting essentially of silica, in the absence of fluxes, bonding the crystals of zirconium silicate together, the mullite crystals being in the vitreous matrix and filling the interstices between the zirconium silicate crystals, the proportion of vitreous matrix being less than 20% by weight of the body and the proportion of zirconium silicate being between 40% and 85% by weight of the body.

2. A refractory block for use in the construction of a tank furnace for glass manufacture consisting substantially of crystals of zirconium silicate, and crystals of mullite and a vitreous matrix consisting essentially of silica, in the absence of fluxes, bonding the crystals of zirconium silicate together, the mullite crystals being in the vitreous matrix and filling the interstices between the zirconium silicate crystals, the proportion of vitreous matrix being less than 20% by weight of the block and the proportion of zirconium silicate being between 40% and 85% by weight of the block.

3. A method of manufacturing a coherent body of refractory material which comprises the steps of preparing a mixture consisting essentially of clay and zircon in the absence of fluxes, the zircon being in a proportion between 37% and 83% by weight of the mixture, moulding the said mixture to a desired shape, and heating the said mixture for at least 24 hours at a temperature of at least 1500° C. but below the fusion temperature of the mixture.

4. A method according to claim 3 wherein the clay is substantially pure china clay.

5. A method according to claim 3 wherein the zircon is in the form of a powder consisting entirely of particles capable of passing through a sieve having 200 meshes to the inch.

6. A method of manufacturing a coherent body of refractory material which comprises the steps of forming a mixture consisting essentially of powdered zircon and china clay in the absence of fluxes, the zircon being in a proportion between 37% and 83% by weight of the mixture, into a slurry with water containing a small proportion of deflocculating agent, casting the said slurry in a plaster mould, drying the outside of the casting, stripping the mould off the casting, allowing the casting to harden throughout, and heating the casting for at least 24 hours at a temperature of at least 1500° C. but below the fusion temperature of the mixture.

7. A method of manufacturing a refractory block for use in the construction of a tank furnace for glass manufacture which comprises the steps of preparing a mixture in the absence of fluxes consisting of 75% powdered zircon of particles capable of passing through a sieve having 200 meshes to the inch, and 25% china clay containing 89.2% $Al_2O_3.2SiO_2$, forming this mixture into a thick slurry with water containing sodium silicate and sodium carbonate in the proportions of 0.4% and 0.1% respectively by weight of the weight of the china clay, pouring the slurry into a plaster mould in the shape of a tank block, allowing the outside of the moulded block to harden, stripping the mould off the block, allowing the block to stand at room temperature to harden throughout, heating the block slowly in a furnace to a temperature of 1550° C., maintaining the block at this temperature for two days, and allowing the block to cool slowly to room temperature.

References Cited in the file of this patent

UNITED STATES PATENTS

| Number | Name | Date |
|---|---|---|
| 1,682,251 | Riddle | Aug. 28, 1928 |
| 2,303,304 | Schleicher et al. | Nov. 24, 1942 |

FOREIGN PATENTS

| Number | Country | Date |
|---|---|---|
| 379,098 | Germany | 1923 |